(12) United States Patent
Houghton, II et al.

(10) Patent No.: US 11,280,805 B2
(45) Date of Patent: Mar. 22, 2022

(54) ROBOT DEVICE FOR COLLECTION OF SOLID, LIQUID AND/OR MULTIPHASE SAMPLES

(71) Applicant: CHEMTHIEF, LLC, St. Johns, MI (US)

(72) Inventors: Larry Richard Houghton, II, St. Johns, MI (US); Gordon Scott Johns, Nicholasville, KY (US); David Lambert Buck, Perrinton, MI (US)

(73) Assignee: Chemthief, LLC, St. Johns, MI (US)

( * ) Notice: Subject to any disclaimer, the term of this patent is extended or adjusted under 35 U.S.C. 154(b) by 380 days.

(21) Appl. No.: 16/386,751

(22) Filed: Apr. 17, 2019

(65) Prior Publication Data

US 2019/0369133 A1 Dec. 5, 2019

Related U.S. Application Data

(60) Provisional application No. 62/680,623, filed on Jun. 5, 2018.

(51) Int. Cl.

| G01N 1/14 | (2006.01) |
|---|---|
| G01N 1/08 | (2006.01) |
| G01N 35/00 | (2006.01) |
| G01N 35/10 | (2006.01) |
| F04B 9/02 | (2006.01) |
| F04B 13/00 | (2006.01) |

(52) U.S. Cl.
CPC ........... *G01N 35/1009* (2013.01); *F04B 9/02* (2013.01); *F04B 13/00* (2013.01); *G01N 1/08* (2013.01); *G01N 1/14* (2013.01); *G01N 35/0099* (2013.01); *G01N 2001/1427* (2013.01)

(58) Field of Classification Search
None
See application file for complete search history.

(56) References Cited

U.S. PATENT DOCUMENTS

| 3,991,627 | A | * | 11/1976 | Laird | B01F 11/0008 |
|---|---|---|---|---|---|
| | | | | | 73/864.16 |
| 4,721,137 | A | * | 1/1988 | Muller | G01N 35/1079 |
| | | | | | 141/276 |
| 4,808,381 | A | * | 2/1989 | McGregor | A61J 1/1406 |
| | | | | | 215/307 |
| 4,951,512 | A | * | 8/1990 | Mazza | G01N 35/1079 |
| | | | | | 141/130 |

(Continued)

FOREIGN PATENT DOCUMENTS

WO WO 2017/204868 A1 11/2017

*Primary Examiner* — Brian R Gordon
(74) *Attorney, Agent, or Firm* — Knechtel, Demeur & Samlan

(57) ABSTRACT

A robot accessory and/or device that provides a sample collector device, a sample storage device, and a work surface. Upon activation, the sample collector device performs a full cycle in which an actuator causes the movement (i.e., extension and then retraction) of an actuator arm that simultaneously causes the top link plate, the lance plunger, the plunger guide, and the plunger to likewise move, including the depression and/or compression and release of the pipette. During this full cycle, this single device is able to remotely collect solid, liquid and/or multiphase samples of potentially hazardous materials and reduces human exposure to this hazardous material and dangerous environment.

7 Claims, 6 Drawing Sheets

(56) References Cited

U.S. PATENT DOCUMENTS

| | | | | |
|---|---|---|---|---|
| 4,962,041 A * | 10/1990 | Roginski | G01N 35/0099 | 324/687 |
| 4,974,457 A * | 12/1990 | Angst | G01N 35/1079 | 73/863.81 |
| 5,055,271 A * | 10/1991 | Golias | B01L 3/0293 | 422/63 |
| 5,078,970 A * | 1/1992 | Teodorescu | G01N 35/1079 | 422/512 |
| 5,125,544 A * | 6/1992 | Millner | B01L 3/0213 | 141/26 |
| 5,127,541 A * | 7/1992 | Wakatake | B01L 9/06 | 206/443 |
| 5,169,602 A * | 12/1992 | Pang | A61J 1/20 | 215/247 |
| 5,400,923 A * | 3/1995 | Golias | B01L 3/0293 | 222/211 |
| 5,516,491 A * | 5/1996 | Kath | B01J 19/0046 | 422/130 |
| 5,935,523 A * | 8/1999 | McCandless | G01N 35/1079 | 422/510 |
| 6,171,280 B1 * | 1/2001 | Imazu | G01N 35/1079 | 604/118 |
| 2002/0103499 A1 * | 8/2002 | Perez | A61B 5/14532 | 606/182 |
| 2003/0074989 A1 | 4/2003 | Magnussen, Jr. et al. | | |
| 2004/0067165 A1 * | 4/2004 | Isobe | G01N 35/1002 | 422/64 |
| 2004/0112978 A1 * | 6/2004 | Reichel | G01N 35/028 | 239/71 |
| 2005/0223822 A1 * | 10/2005 | Ozbal | G01N 35/1079 | 73/864.41 |
| 2006/0216208 A1 * | 9/2006 | Li | G01N 35/1079 | 422/561 |
| 2006/0229528 A1 * | 10/2006 | Heske | A61B 10/0283 | 600/567 |
| 2006/0263250 A1 * | 11/2006 | Blouin | B01L 13/02 | 422/63 |
| 2009/0269229 A1 * | 10/2009 | Yeo | F04F 3/00 | 417/480 |
| 2010/0015010 A1 * | 1/2010 | Tajima | B01L 3/021 | 422/400 |
| 2010/0278698 A1 * | 11/2010 | Tajima | G01N 35/1016 | 422/522 |
| 2010/0310426 A1 * | 12/2010 | Campbell | B01L 3/563 | 422/516 |
| 2013/0280143 A1 | 10/2013 | Zucchelli et al. | | |
| 2015/0027241 A1 * | 1/2015 | Domkofski | G01N 1/14 | 73/863.81 |
| 2016/0288118 A1 * | 10/2016 | Profitt | B01L 3/021 | |
| 2016/0332156 A1 * | 11/2016 | Tajima | G01N 35/1079 | |
| 2017/0108521 A1 | 4/2017 | Sasaki et al. | | |
| 2017/0128932 A1 * | 5/2017 | Ito | G01N 35/1081 | |
| 2017/0131308 A1 * | 5/2017 | Ito | C12M 33/06 | |
| 2018/0036725 A1 * | 2/2018 | Le | B01L 3/021 | |
| 2018/0073986 A1 * | 3/2018 | Wolter | G01N 21/76 | |
| 2018/0133716 A1 | 5/2018 | Guzman et al. | | |
| 2019/0168219 A1 * | 6/2019 | Caplin | C12M 23/16 | |
| 2020/0096528 A1 * | 3/2020 | Komori | G01N 35/109 | |
| 2021/0181224 A1 * | 6/2021 | Onoki | G01N 35/1011 | |

* cited by examiner

ROBOT DEVICE FOR COLLECTION OF SOLID, LIQUID AND/OR MULTIPHASE SAMPLES

I. CROSS-REFERENCE TO RELATED APPLICATION

This patent application is a non-provisional application claiming priority from U.S. Provisional Patent Application Ser. No. 62/680,623, entitled "Robot Accessory For Collection of Solid, Liquid and/or Multiphase Samples", filed on Jun. 5, 2018, and is fully incorporated herein by reference.

II. FIELD OF THE INVENTION

The present invention relates to tactical robotic collection of representative sample material and, in particular, a robot accessory and/or device designed to utilize the interaction of various components, and associated process, to remotely collect solid, liquid and/or multiphase samples of potentially hazardous materials while reducing human exposure to this hazardous material and dangerous environment.

III. BACKGROUND OF THE INVENTION

Robots have been used in situations deemed too dangerous for human intervention. Applicant's invention is used in conjunction with a robot to retrieve a sample from a remote location. Threat identification is often a mission critical capability. Military personnel, first responders, hazardous materials response teams, bomb squads, drug response teams, radiation workers and others ("responders") often base their response on the identity of a threat substance. The threat substance is often identified through a representative sample, which must be tested in the dangerous area or brought to a safe, controlled location to be tested and identified. However, to prevent any unnecessary risk and danger to the responders, there is a need and there has never been disclosed Applicant's unique invention for obtaining the representative sample while providing increased safety by reducing human exposure to dangerous environments and minimizing the amount of sample material being tested.

IV. SUMMARY OF THE INVENTION

The present invention is a device that provides a sample collector device, a sample storage device, and a work surface. Upon activation, the sample collector device performs a full cycle in which an actuator causes the movement (i.e., extension and then retraction) of an actuator arm that simultaneously causes the top link plate, the lance plunger, the plunger guide, and the plunger to likewise move, including the depression and/or compression and release of the pipette. During this full cycle, this single device is able to remotely collect solid, liquid and/or multiphase samples of potentially hazardous materials and reduces human exposure to this hazardous material and dangerous environment.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
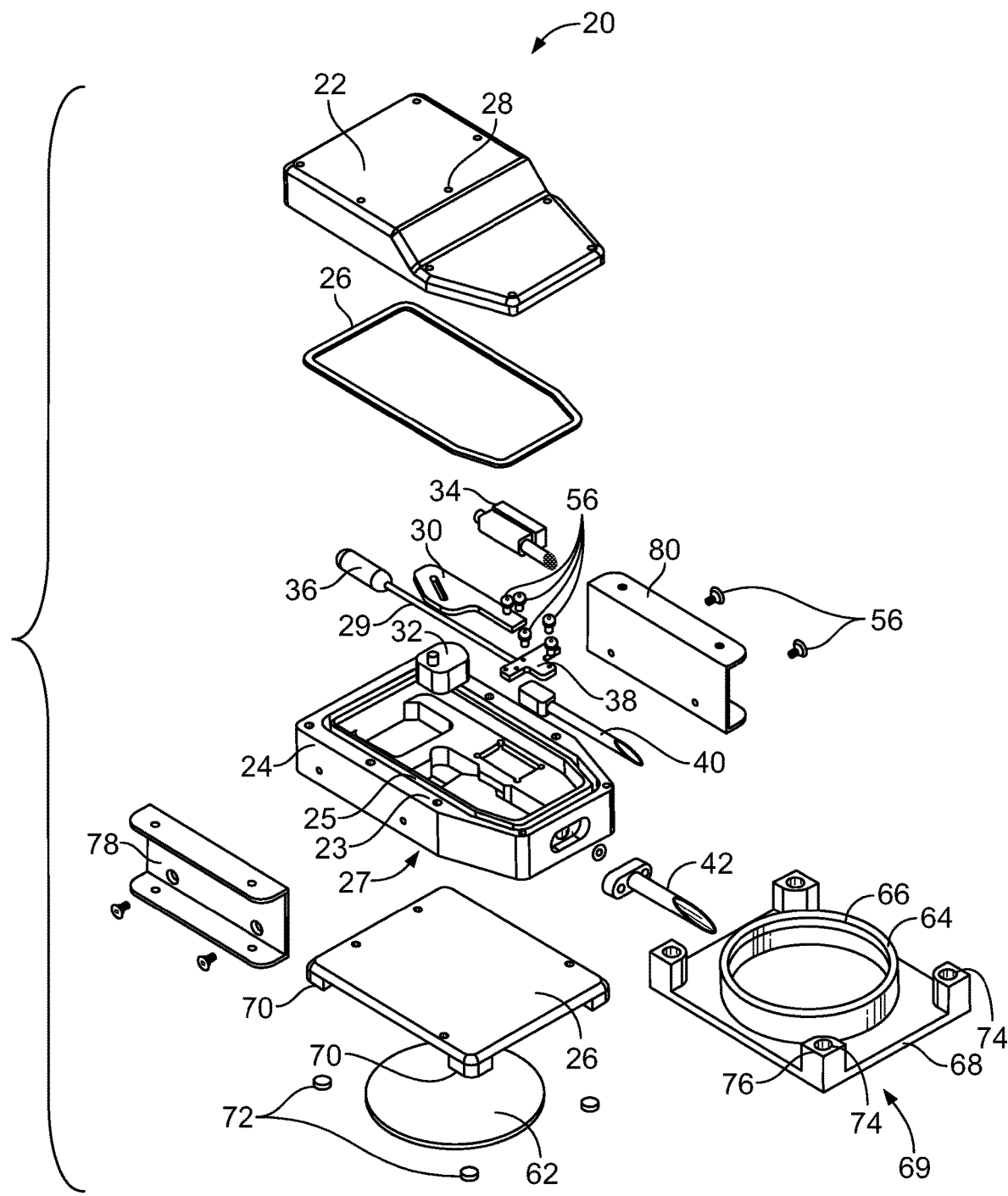
FIG. 1 is an exploded perspective view, as viewed from the top, of the sample collector device ("device") and, in particular, illustrating the various components, including the internal components, of the device.

Turning first to FIG. 1, there is illustrated an exploded perspective view, as viewed from the top, of a sample collector device 20 ("device 20"). The device 20 comprises a lid 22, a base 24, and a containment lid 26.

The lid 22 is fixedly secured to the top side 23 of the base 24 and utilizes a lid seal 26 fitted in a self-contained hollow channel 25 in the base 24 and tightened between the lid 22 and the top side 23 of the base 24 to prevent rain, moisture, and other contaminants from entering the device 20. The lid 22 is also provided with an indicator light 28 which is activated or turns on to inform the robot operator that the device 20 is operating and cycling through a "full cycle", as described in more detail below; and then when the full cycle is complete, the indicator light 28 is deactivated or turns off to inform the robot operator that the device 20 is now powered off.

The base 24 is preferably a milled plastic, or any other material known to one skilled in the art that accomplishes the purpose as disclosed herein, and acts as the primary rigid housing that encloses and protects the internal components comprising a plunger guide 30, a plunger 32, an actuator 34, a pipette 36, a top link plate 38, a lance plunger 40, and a lance 42.

The actuator 34 and a microcontroller 44 (see FIG. 2) are powered by a battery 46 (see FIG. 4) or, alternatively, a robot (not illustrated). The microcontroller 44 (see FIG. 2) is controlled by the robot (not illustrated) through attached electrical connector cables 49 extending through a connection port 52 (see FIG. 2) with pin connections and adaptors 50 (see FIG. 2) to the microcontroller 44 (see FIG. 2). The actuator 34 is controlled by the microcontroller 44 (see FIG. 2) or, alternatively, the robot (not illustrated) through attached electrical connector cables 48 with pin connections and adaptors 50 (see FIG. 2) to the actuator 34 and provides movement, using an actuator arm 54 (see FIG. 3), to the top link plate 38, lance plunger 40, plunger guide 30, plunger 32, and pipette 36.

Figure 3:
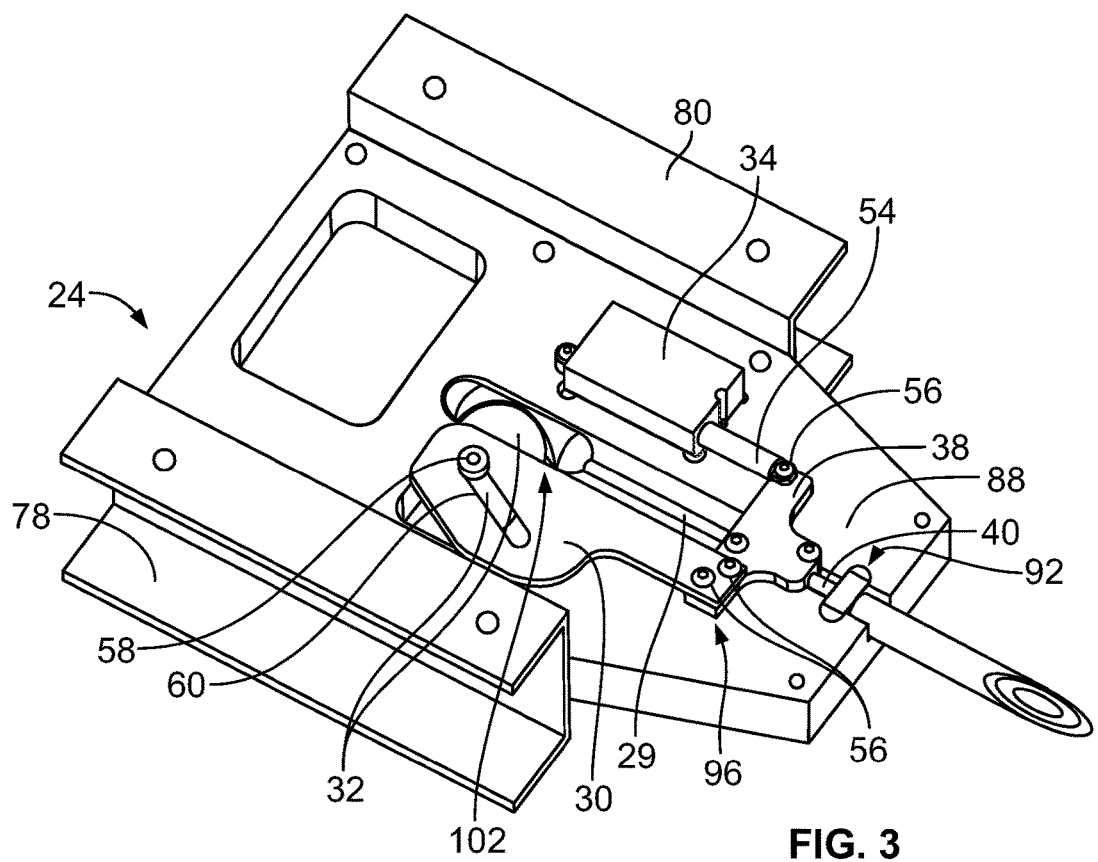
FIG. 3 is a perspective view, as viewed from the top, of the device and, in particular, illustrating the activation of the actuator and the actuator arm and the plunger guide in the extended position.
Figure 4:
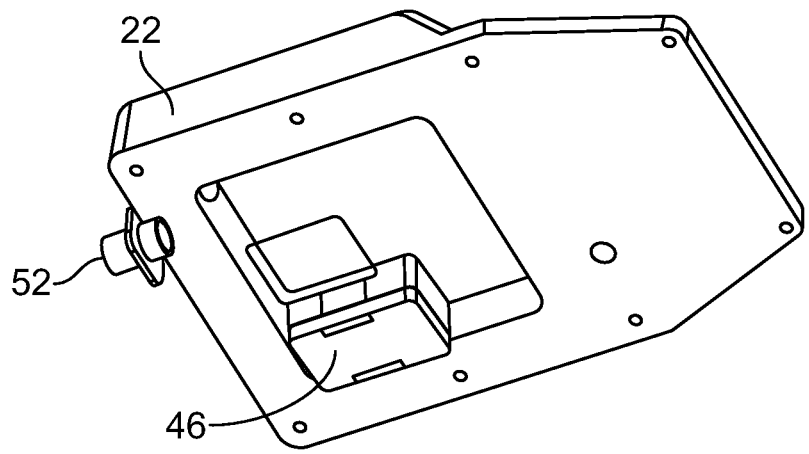
FIG. 4 is a perspective view, as viewed from the bottom, of the lid of the device and, in particular, illustrating the battery contained therein.
Figure 5:
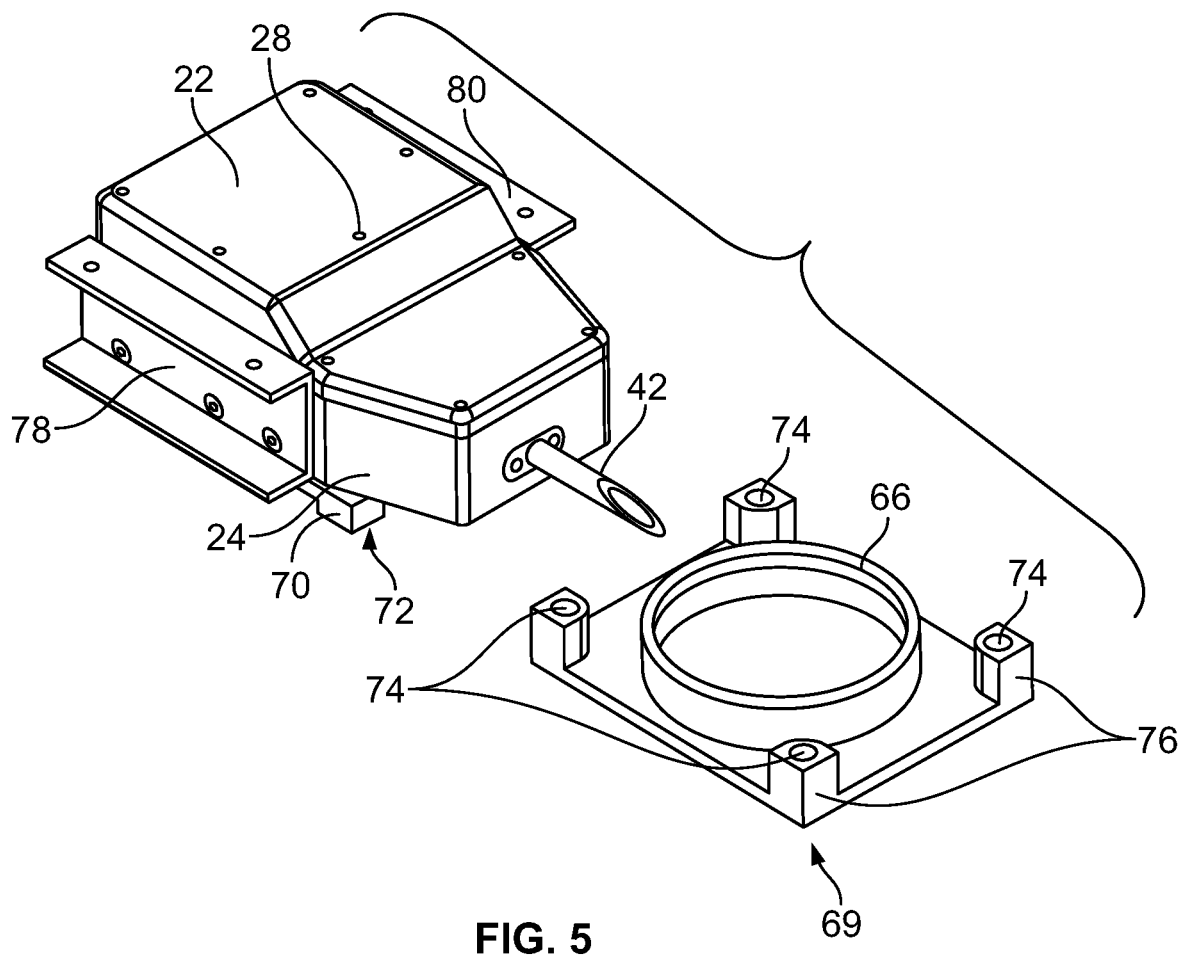
FIG. 5 is a perspective view, as viewed from the top, of the device as assembled, and separated from the sample storage device.

As further illustrated in FIG. 3, in the preferred embodiment, the actuator arm 54 is fixedly secured to the top link plate 38; the top link plate 38 is connected to the lance plunger 40 and retracts or extends the lance plunger 40; the top link plate 38 is further connected to the plunger guide 30; the plunger 32, using a plunger post 58, is directionally controlled by the movement of the plunger guide 30 through the use of a plunger slot 60; and the depression and/or compression and release of the pipette 36 is accomplished by the plunger 32 based on the movement and directional control of the plunger guide 30. The fixedly securing and/or connection of these parts is accomplished using screws 56 or any other means known to one skilled in the art.

Thus, as explained in further detail below, upon the activation of the actuator 34 causing the movement (i.e., extension or retraction) of the actuator arm 54 causes all of these other parts (i.e., the top link plate 38, lance plunger 40, plunger guide 30, plunger 32) to likewise move, and the depression and/or compression and release of the pipette 36.

The pipette 36 is preferably a polyethylene pipette that is 15.5 cm in length with a bulb draw of 3.3 ml within the lance plunger 40 within the lance 42. Alternatively, the pipette 36 may be any other type, material, size, length, etc. . . . provided that the pipette used in the device 20 accomplishes the invention and the purpose as described herein.

Referring back to FIG. 1, the bottom side 27 of the base 24 has a smooth surface that, using a seal 62 secured to the contamination lid 26, forms a seal to the upper side 64 of a glass dish receptacle and/or container 66 formed in a holding base 68. The seal 62 is preferably a smooth surface, flexible, chemical resistant seal to contain the sample within the container 66. The containment lid 26, at each of its corners 70, have secured therein magnetic connectors 72 that mate to similar magnetic connectors 74 in each of the corners 76 of the sample storage device 69 (collectively referred to as the container 66, the holding base 68, the corners 76, and the magnetic connectors 74). In this manner, upon mating the sample container device 69 to the base 24, the sample container device 69 is secured to and may be carried below the base 24 during transport by a robot.

In the preferred embodiment, the sample storage device 69 is milled from plastic. The container 66 preferably provides a top or bottom half of a 100 mm diameter borosilicate petri dish, although any size or diameter may work if used in the manner described herein. Additionally, a layer of compressible foam (not illustrated) is positioned under and between the container 66 and the holding base 68. In use, this compressible foam (a) provides shock absorption to the sample storage device 69 during transport and movement; and (b) forces the rim of the container 66 (i.e., glass dish) against the flexible, chemical resistant seal 62 adhered to the lower side of the containment lid 26 secured to the base 24.

Situated on opposed sides of the base 24 are gripper channels 78, 80, and are designed as universal adapters to fit several robot grippers 82 of a robot arm 84 (see FIGS. 4-11) connected to a robot transport (not illustrated). In this manner, the robot grippers 82 (acting like fingers) are placed inside the applicable gripper channels 78, 80, and, using pressure from the robot grippers 82, secure the device 20 within the robot arm 84.

Operation of the device 20 will vary by specific user circumstance; however, typical operation is described as follows:

Upon command from the robot, or a control such as a firing circuit from the robot, the microcontroller 44 causes direct movement of the device 20 through a cycle ("full cycle"). In the preferred embodiment, a full cycle lasts approximately forty (40) seconds; however, this could be longer or shorter as desired by the user. The microcontroller 44 is also programmed to move components and samples slowly to prevent sample spray or uncontrolled dispersal.

Figure 2:
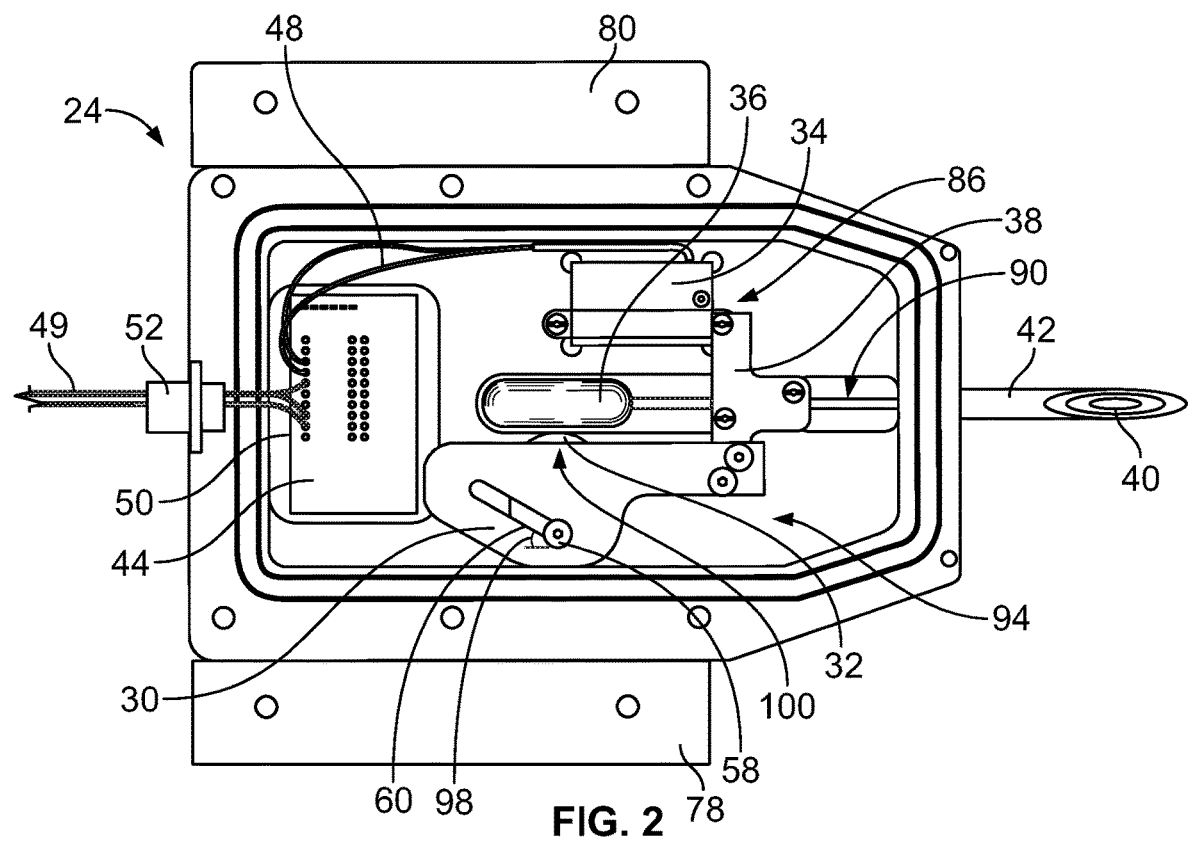
FIG. 2 is a top perspective view of the base of the device and, in particular, illustrating the relation of the various internal components, the actuator and the plunger guide in the resting or retracted position.

At the beginning of this cycle, the actuator 34 is in the resting or ready for use position which means the actuator arm 54 is in a retracted position 86 within the actuator 34. Once the cycle begins, the actuator 34 begins to extend the actuator arm 54 outwardly from the retracted position 86 (as illustrated in FIG. 2) until the actuator arm 34 reaches an extended position 88 (as illustrated in FIG. 3).

As this occurs, with the actuator arm 54 fixedly secured to the top link plate 38, the top link plate 38 likewise moves outwardly in the same direction. Simultaneously, as the top link plate 38 is connected to the lance plunger 40, this movement of the top link plate 38 causes the lance plunger 40 to move from its resting or ready for use position, a lance retracted position 90 (as illustrated in FIG. 2) to a lance extended position 92 (as illustrated in FIG. 3).

With the top link plate 38 likewise further connected to the plunger guide 30, this movement of the top link plate 38 simultaneously causes the plunger 32 to likewise move outwardly in the same direction, in parallel directional alignment with the actuator arm 34 and top link plate 38. This movement of the top link plate 38 causes the plunger guide 30 to move from its resting or ready for use position, a plunger guide retracted position 94 (as illustrated in FIG. 2) to a plunger guide extended position 96 (as illustrated in FIG. 3).

As this occurs, plunger guide 30 forces the plunger post 58 to move or traverse through the plunger slot 60. With the plunger slot 60 situated at an angle 98 to the directional movement of the plunger guide 30, the plunger slot 60 forces the plunger post 58 to move along and at this same angle 98 as the plunger slot 60. While this occurs, as the plunger post 58 is fixedly secured to the plunger 32, the movement of the plunger post 58, through the plunger slot 60 at this angle 98, forces or causes the plunger 32 to move at a ninety degree (90°) angle in relation to the directional movement of the plunger guide 30 and directly toward the pipette 36. In this manner, the plunger 32 moves from a plunger retracted position 100 (as illustrated in FIG. 2) to a plunger extended position 102 (as illustrated in FIG. 3). When the plunger 32 reaches the plunger extended position 102, the plunger 32 is forcing or causing a depression and/or compression into the pipette 36.

Half way through this full cycle, the actuator arm 54 has been moved from the retracted position 86 to the extended position 88; the lance plunger 40 has been moved the lance retracted position 90 to the lance extended position 92; the plunger guide 30 has been moved from the plunger guide retracted position 94 to the plunger guide extended position 96; the plunger 32 has been moved from the plunger retracted position 100 to the plunger extended position 102;

and a depression and/or compression has been formed in the pipette 36. This is referred to collectively as the "extended position of the device 20".

Once the actuator arm 54 reaches the extended position 88 (as illustrated in FIG. 3), the actuator 34 begins to retract the actuator arm 54 from the extended position 88 (as illustrated in FIG. 2) until the actuator arm 34 is returned to the retracted position 86 (as illustrated in FIG. 3). In the same manner as they extended, each of the other parts are likewise retracted in the remaining last half of this full cycle: the lance plunger 40 is moved from the lance extended position 92 to the lance retracted position 90; the plunger guide 30 is moved from the plunger guide extended position 96 to the plunger guide retracted position 94; the plunger 32 is moved from the plunger extended position 102 to the plunger retracted position 100; and the pipette 36 is released from the depression and/or compression caused by the plunger 32. This is referred to collectively as the "retracted position of the device 20". The purpose of the depression and/or compression and subsequent release of the pipette 36 is explained in further detail below.

Figure 6:
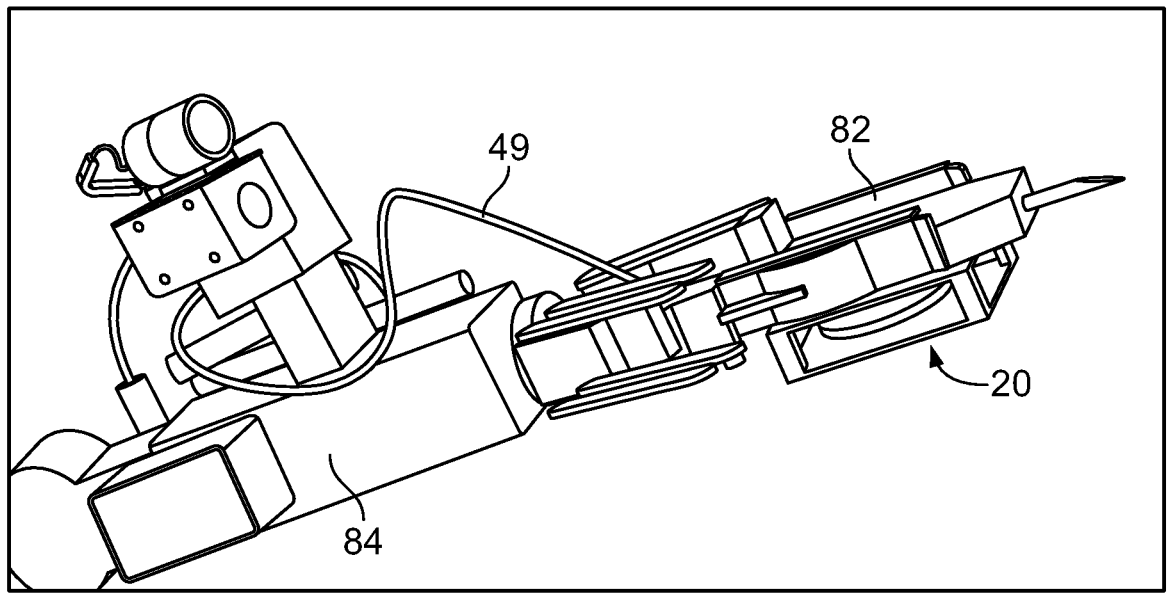
FIG. 6 is a side perspective view of the device as controlled by the robot arm of a robot transport.

Now, with an understanding of how the device 20 is operating, the process for using the robot and the device 20 for obtaining a representative sample while providing increased safety by reducing human exposure to dangerous environments and minimizing the amount of sample material being tested, is as follows:

First, referring to FIG. 6, the robot grippers 82 (acting like fingers) and controlled by the robot arm 84 are placed inside the applicable gripper channels 78, 80 (see FIG. 3), and, using pressure from the robot grippers 82, secures the device 20 within the robot arm 84. The device 20 is likewise magnetically connected to the sample storage device 69.

Second, the robot operator maneuvers the robot (not illustrated) to a work site 106 (see FIG. 9) where a sample 108 (see FIG. 9) is located and places a work surface 104 on a supporting surface at the work site 106. The sample 108 may be any solid, liquid, powder, paste, gel, soil, etc. . . . and/or any multiphase mixture of any of these. Preferably, the work surface 104 is likewise carried by the robot arm 84 of the robot (not illustrated), for example, inserting a portion of the robot arm 84 (including the device 20) inside a void or cavity 110 (see FIG. 11) in the work surface 104 that then is used to hang, carry, or transport the work surface 104; or any other means known to one skilled in the art for the robot to carry the work surface 104.

Figure 11:
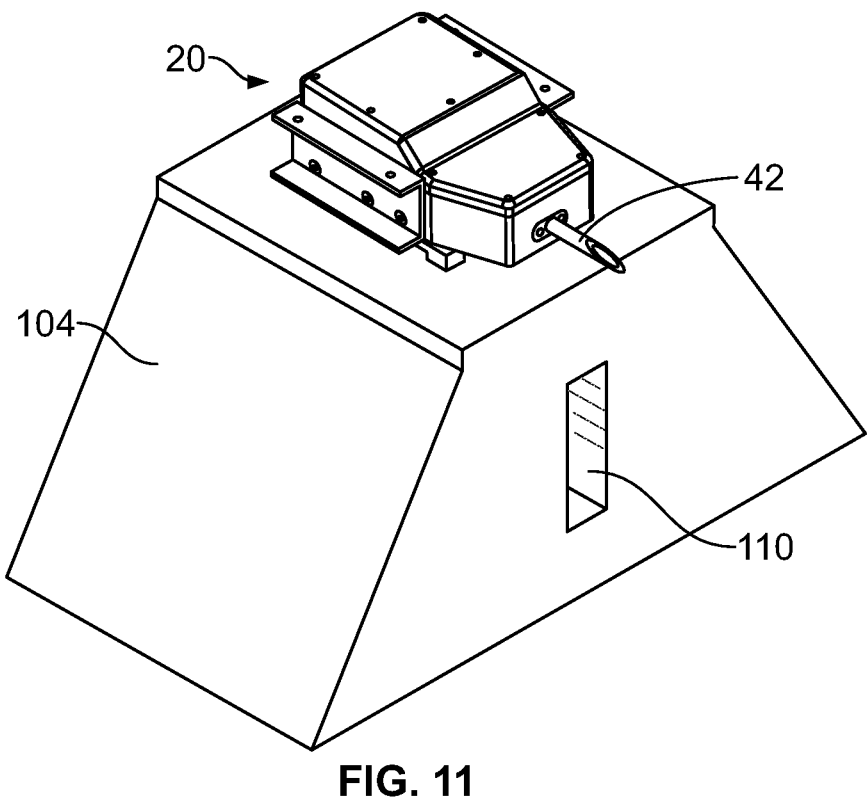
FIG. 11 is a perspective view, as viewed from the top, illustrating the device, with the robot arm of the robot transport removed, in relation to the work surface.

The work surface 104 is preferably a lightweight foam cushion material in a roughly pyramid shape (see FIG. 11). The shape provides a firm base upon floor, ground, tabletop or other supporting area. The work surface 104 has a flat top which is provided with a recessed area 112 to hold the sample storage device 69 during this sample collection operation.

Figure 7:
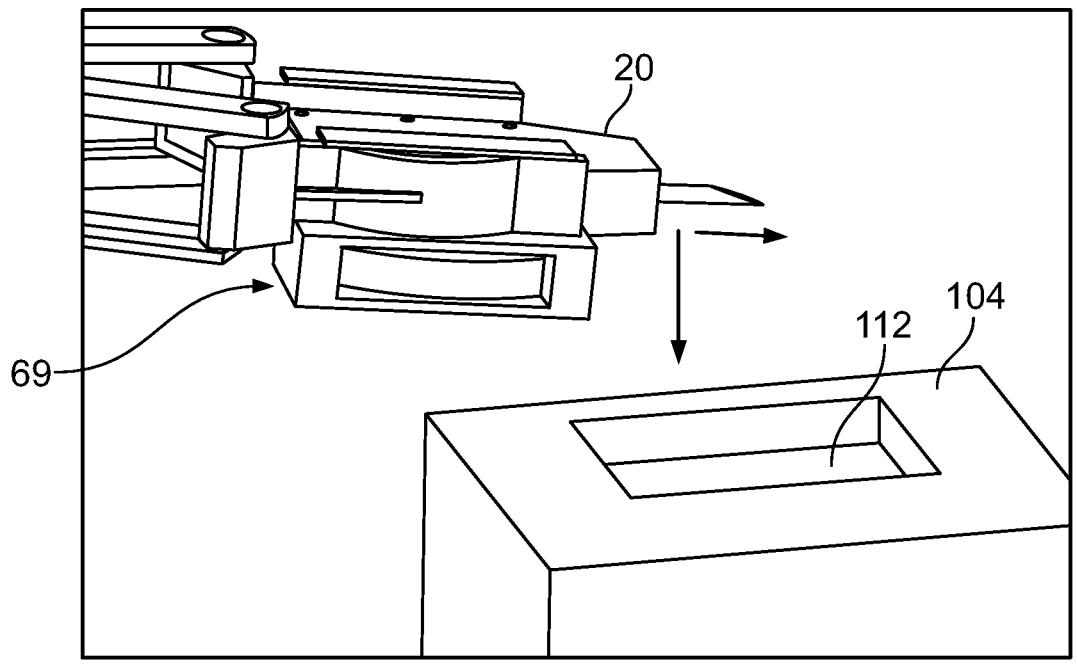
FIG. 7 is a side perspective view of the device as controlled by the robot arm of a robot transport prior to placing the sample storage device into the recessed area of the work surface.
Figure 8:
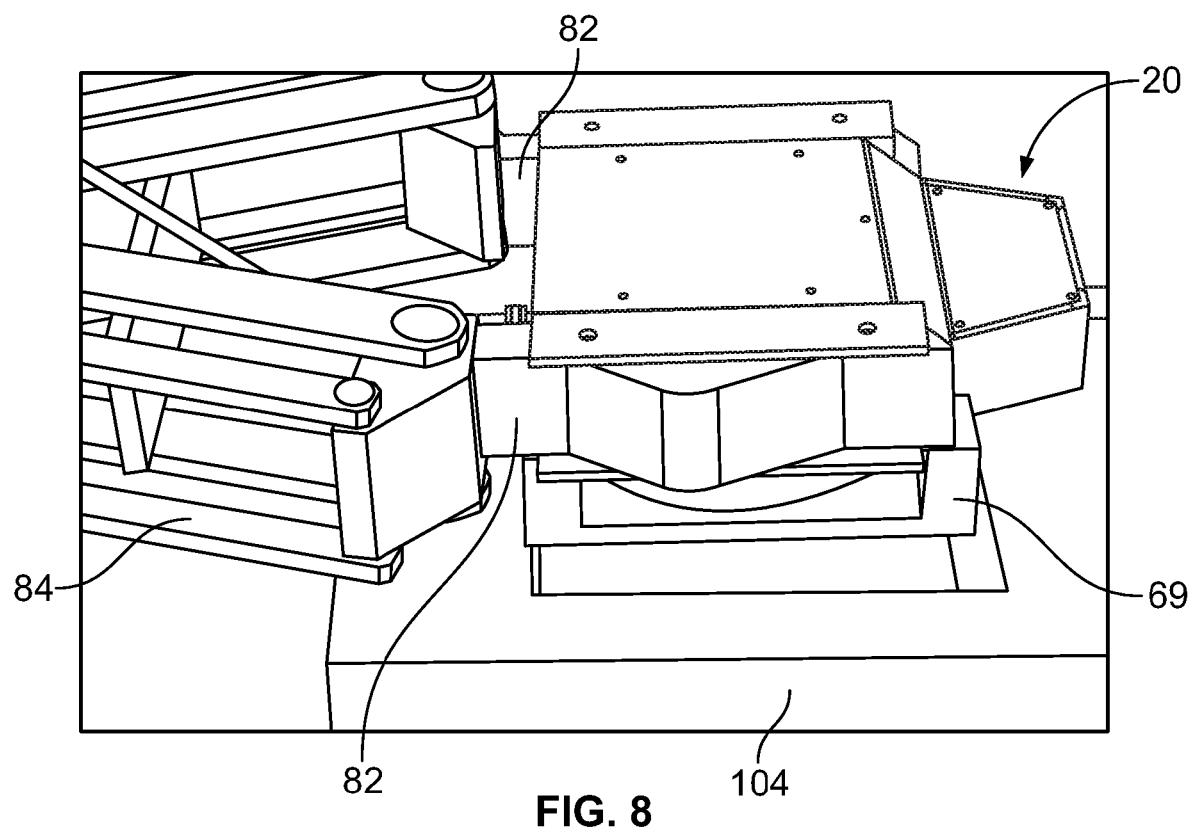
FIG. 8 is a top perspective view of the robot arm of a robot transport, arranging the device, in alignment with, and just prior to placing the sample storage device into the recessed area of the work surface.

Third, the robot operator maneuvers the robot arm 84 to align the sample storage device 69 into the recessed area 112 in the top of the work surface 104, as illustrated in FIG. 7; places the sample storage device 69 into the recessed area 112, as illustrated in FIG. 8; and then separates the sample storage device 69 from the robot arm 84 leaving the sample storage device 69 on the work surface 104. The separation of the sample storage device 69 from the robot arm 84 is preferably accomplished by either:

(i) moving the robot grippers 82 and the device 20 laterally in any direction away from the work surface 104. As the sample storage device 69 is situated and retained in the recessed area 112, the recessed area 112 prevents movement of the sample storage device 69. As long as the lateral movement pressure exerted by the robot grippers 82 to the device 20 exceeds the magnetic coupling of the containment lid 26 to the housing base 68, the device 20 will be separated from the sample storage device 69; or (ii) rotating the robot grippers 82 and the device 20 in any in any direction away from the work surface 104. Again, as the sample storage device 69 is situated and retained in the recessed area 112, the recessed area 112 prevents movement of the sample storage device 69. As long as the rotation movement pressure exerted by the robot grippers 82 to the device 20 exceeds the magnetic coupling of the containment lid 26 to the housing base 68, the device 20 will be separated from the sample storage device 69.

Figure 9:
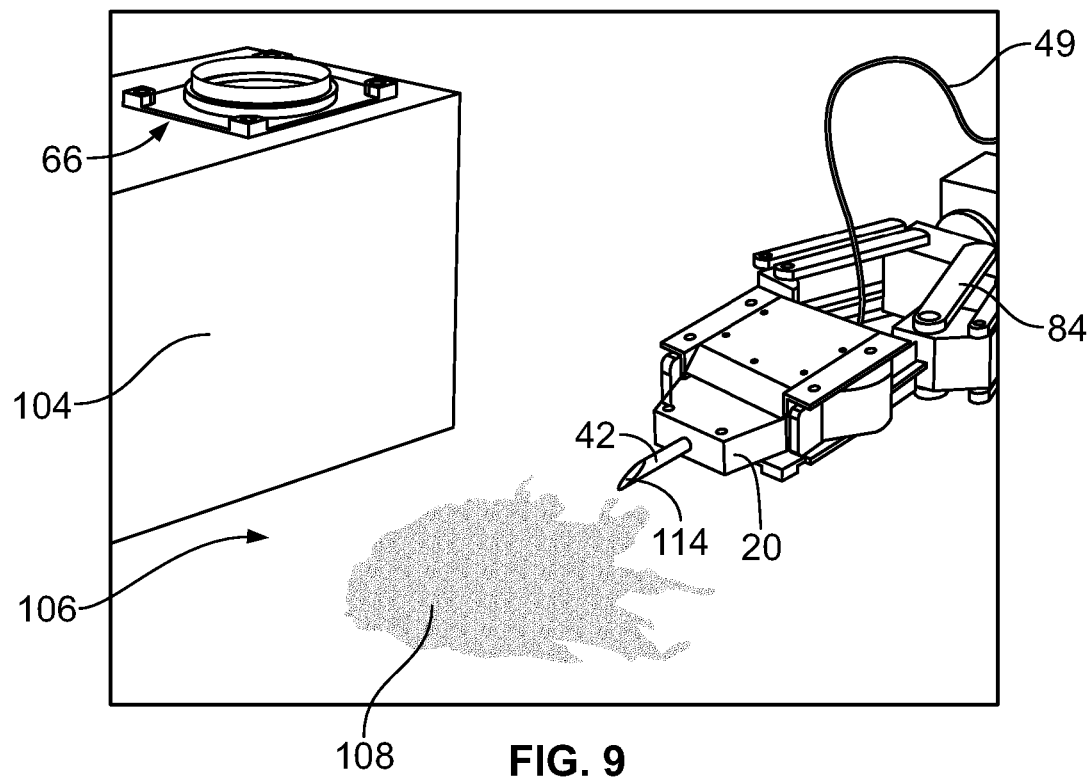
FIG. 9 is a perspective view of the robot arm of a robot transport, arranging the device in alignment for collecting a sample of a threat substance for subsequent storage placement into the sample storage device.

Fourth, the robot operator maneuvers the robot arm 84 to align the device 20 with the sample 108, as illustrated in FIG. 9. The sample 108 is then collected by the device 20. This is accomplished by operating the device 20 through the full cycle and/or activating the device 20 to perform the full cycle. During this full cycle:

(i) if the sample 108 is a solid material, the lance 42 of the device 20 is placed in the sample 108 to scoop, bore, stab, shovel, dig or collect a solid into an opening 114 in the sharpened end of the lance 42. Preferably, the opening 114 in the sharpened end of the lance 42 provides a volume for approximately two grams of an ordinary solid or multiphase sample. The sample 108 is simply collected within the lance 42. This collection occurs at any time after the extended position of the device 20, as when extended, the opening 114 in the sharpened end of the lance 42 provides nearly no volume for an ordinary solid or multiphase sample to be collected at that moment; and/or (ii) if the sample 108 is liquid, lance 42 of the device 20 is placed in the sample 108. During the operation and cycle and extended position of the device 20, a pipette stem 29 within the lance plunger 40 within the lance 42 is submerged, injected, covered or pushed into the sample 108 (i.e., in this case, a liquid). In the extended position of the device 20, due to the depression and/or compression of the pipette 36 by the plunger 32, air is ejected from the pipette 36 into the sample 108 (i.e., in this case, a liquid). In a non-limiting example, approximately 2 cubic centimetres of air could be expelled into the sample 108 (i.e., in this case, the liquid). In a non-limiting example, when extended, the pipette 36 may have a compressed volume that is substantially 2 cubic centimeters smaller than the relaxed volume during the retracted position of the device 20. As the cycle continues back to the retracted position of the device 20 and with the pipette stem 29 within the lance plunger 40 within the lance 42 still submerged, injected, covered or pushed into the sample 108 (i.e, in this case, liquid), the liquid is then vacuumed, drawn, or pulled through the pipette stem 29 within the lance plunger 40 within the lance 42 and into the pipette 36 as the full cycle is completed; and/or (iii) if the sample 108 is a multiphase sample (i.e., meaning the sample 108 contains any combination of solid, liquid, powder, paste, gel, soil, etc. . . . ), the same results occurs. The solid and liquid each remain collected in the same manner as described above.

Figure 10:
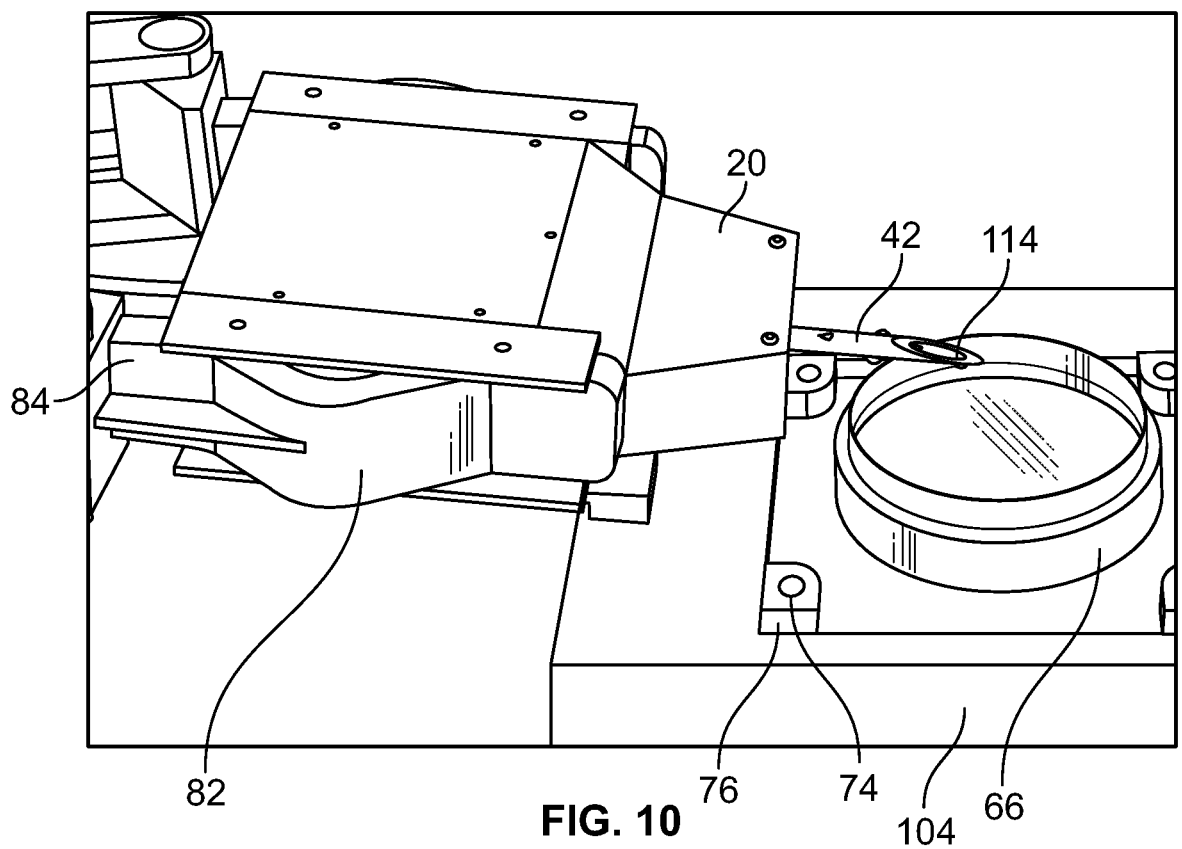
FIG. 10 is a perspective view, as viewed from the top, of the robot arm of a robot transport, arranging the device, in alignment with, and just prior to releasing the sample of the threat substance into the sample storage device retained within the recessed area of the work surface.

Fifth, once the sample 108 is collected, the robot operator maneuvers the robot arm 84 back to the work surface 104. The device 20 is aligned with the sample storage device 69 located within the recessed area 112 in the top of the work surface 104 and, in particular, with the container 66, as illustrated in FIG. 10. The sample 108 is then ejected or released from the device 20 into the container 66. This is accomplished by operating the device 20 through another full cycle and/or activating the device 20 to perform another full cycle. During this repeated full cycle:

(i) if the sample 108 is a solid material, any sample 108 collected within the lance 42 of the device 20 may be dumped into the container 66 through rotation of the device 20 by the robot grippers 82 over the container 66 and/or ejected or physically pushed out through the movement of the internal components during the full cycle (including extended position of the device 20);

(ii) if the sample 108 is liquid, during the operation and cycle and due to the depression and/or compression of the pipette 36 by the plunger 32 during the extended position of the device 20, the liquid is ejected from the pipette 36 through the pipette stem 29 within the lance plunger 40 within the lance 42 and released into the container 66; and/or (iii) if the sample 108 is a multiphase sample (i.e., meaning the sample 108 contains any combination of solid, liquid, powder, paste, gel, soil, etc. . . . ), the same results occurs. The solid and liquid each remain ejected or released from the device 20 in the same manner as described above.

Sixth, once the sample 108 has been transferred to the container 66, the robot grippers 82 aligns the device 20 over the housing base 68 and, in particular, re-align the corners 70, and magnets 72, of the containment lid 26 with the corners 76, and magnets 74, of the housing base 68 to magnetically re-couple the containment lid 26 to the housing base 68. In this manner, the device 20 is re-connected to the sample storage device 69 with the sample 108 sealed within the container 66 by the seal 62 formed between the contamination lid 26 and the upper side 64 of a glass dish receptacle and/or container 66.

Seventh, the robot operator maneuvers the robot (not illustrated) and transports the sample 108 to an area where a human disconnects the sample storage device 69 from the device 20 and retrieves the sample 108 for further examination. Preferably, the container 66 is also provided with viewing ports to allow the sample 108 to be viewed visually prior to retrieving the sample 108. In a non-limiting example, for example, four viewing ports may be equally spaced around the circumference of the container 66. In this manner, the viewing ports allow light to enter the container 66 and illuminate the sample 108 while the sample 108 is being viewed through the other viewing port.

Thus, there has been provided Applicant's unique device, and single configuration, for collecting solid, liquid and/or multiphase samples of potentially hazardous materials. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for collecting samples, comprising the steps of:
   providing a housing having an opening;
   providing an actuator fixedly secured within the opening;
   providing an actuator arm attached to the actuator;
   activating the actuator for activating the actuator arm to move from a retracted position to an extended position defining a half cycle and then retracting the actuator arm from the extended position back to the retracted position completing a full cycle, the activating of the actuator causing both the half cycle and the full cycle to occur in a continuous movement;
   performing the following steps during the half cycle:
   (a) providing a plunger guide attached to the actuator arm;
   (b) moving the plunger guide from a plunger guide retracted position to a plunger guide extended position as the actuator arm transitions to the extended position;
   (c) providing a plunger attached to and directionally controlled by the plunger guide;
   (d) moving the plunger from a plunger retracted position to a plunger extended position as the plunger guide transitions to the plunger guide extended position;
   (e) providing the plunger engages and causes a compression of a pipette as the plunger transitions to the plunger extended position;
   (f) causing the compression of the pipette as the plunger transitions to the plunger extended position with the pipette expelling air outwardly from the pipette through a pipette stem attached to the pipette;
   performing the following steps for completing the full cycle:
   (g) moving the plunger guide from the plunger guide extended position back to the plunger guide retracted position as the actuator arm transitions to the retracted position;
   (h) moving the plunger from the plunger extended position back to the plunger retracted position as the plunger guide transitions to the plunger guide retracted position; and
   (i) releasing the compression on the pipette as the plunger transitions to the plunger & retracted position and drawing in a first sample through the pipette stem and into the pipette.

2. The method of claim 1 further comprising the step of providing a lance plunger attached to the actuator arm and moving the lance plunger from a lance retracted position to a lance extended position when the half cycle is completed and back to the lance retracted position when the full cycle is completed.

3. The method of claim 2 further comprising the step of collecting in the lance plunger a second sample.

4. The method of claim 3 further comprising the step of the providing a sample storage device.

5. The method of claim 4 further comprising the step of depositing the first sample from the pipette and the second sample from the lance plunger into a container during a subsequent full cycle.

6. The method of claim 5 further comprising the step of providing the first sample in liquid form and the second sample is in solid form.

7. A method for collecting samples, comprising the steps of:
   providing a housing having an opening;
   providing an actuator fixedly secured within the opening;
   providing an actuator arm attached to the actuator;
   activating the actuator for activating the actuator arm to extend outwardly from the actuator and move from a retracted position to an extended position;
   providing a plunger attached to the actuator;
   moving the plunger from a plunger retracted position to a plunger extended position as the actuator arm transitions to the extended position;
   providing the plunger engages and causes a compression of a pipette as the plunger transitions to the plunger extended position;
   causing the compression of the pipette as the plunger transitions to the plunger extended position with the pipette expelling air outwardly from the pipette through a pipette stem attached to the pipette;

retracting the actuator arm from the extended position back to the retracted position;

moving the plunger from the plunger extended position back to the plunger retracted position as the actuator arm transitions to the retracted position; and releasing the compression on the pipette as the plunger transitions to the plunger retracted position and drawing in a first sample through the pipette stem and into the pipette.

\* \* \* \* \*